United States Patent [19]

Cromwell

[11] 3,807,979

[45] Apr. 30, 1974

[54] QUATERNARY AMMONIUM SILICATE FOR POLISHING SILICON METAL

[75] Inventor: William E. Cromwell, Titusville, N.J.

[73] Assignee: Philadelphia Quartz Compamy, Philadelphia, Pa.

[22] Filed: May 8, 1972

[21] Appl. No.: 251,396

[52] U.S. Cl.............................. 51/308, 51/309, 106/3
[51] Int. Cl............................................... C09c 1/68
[58] Field of Search ................... 51/308, 309; 106/3

[56] References Cited
UNITED STATES PATENTS

| | | | |
|---|---|---|---|
| 3,715,842 | 2/1973 | Tredinnick et al. | 51/308 |
| 3,235,521 | 2/1966 | Pitrot et al. | 260/23 |
| 3,365,312 | 1/1968 | Nowack | 51/308 |
| 3,458,300 | 7/1969 | Duvall | 51/308 |

*Primary Examiner*—Donald J. Arnold
*Attorney, Agent, or Firm*—Fred C. Philpitt; Ernest G. Posner

[57] ABSTRACT

I have developed an improved composition for use in the very exacting procedure of polishing soft thin wafers such as silicon which is to be used as a semiconductor. This composition is a blend of quaternary ammonium silicate and a microfine precipitated silica whereby the proper pH for polishing with microfine silica is obtained and maintained without the necessity of continuous testing.

5 Claims, No Drawings

QUATERNARY AMMONIUM SILICATE FOR POLISHING SILICON METAL

The process of polishing silicon wafers, especially for the preparation of semi-conductors, is complex and necessitates meticulous and even frustrating attention to details. Silicon wafers as thin as 0.008 inches and flat to within a few wave lengths of sodium light on both sides of the wafer are required. There must be no visible scratches or points or pits visible, at least at a magnification of 160× using an interference contrast technique. Great care must be maintained to prevent stray particles of hard dust, which may cause visible scratches, and the wafers must be handled with clean tweezers and the like. While I have emphasized the problems of polishing thin wafers of silicon, this polishing medium can be used with other soft materials such as copper, silver or gold fluorides; zinc, cadmium or silver sulfides and the like; gallium and indium phosphides and the like; germanium, quartz, glass, stone, gems, soft metals, e.g., silver and copper and zinc and hard metals such as highly polished steel and platinum, ceramics including beryllia, alumina, boron nitride and sapphire, and for plastics such as acrylic windows and lenses and organic semi-conductors such as anthracene, calcium and zinc phthalocyanine and the like.

In the preparation of silicon wafers to be coated epitaxially with vaporized silica, the silicon is first sliced into thin wafers with a carefully dressed blade or saw. These wafers are then lapped with special abrasives to develop the required initial thickness, flatness and parallelism and to remove any gauges or other irregularities related to the cutting or sawing. Between these lapping operations, the wafer is carefully cleaned and often etched to prevent damage and permit observation of the surface. Finally the wafers are removed to another dust free room which is maintained under positive air pressure to avoid any accidents which might mar the prepared surface and the final chemo-mechanical polishing is carried out with special silica polishing agents at a carefully controlled pH. It has been known to use an alkaline precipitated silica in a slurry with the addition of sodium hydroxide or ammonium hydroxide to control the pH at above about 9.5 and preferably between 10.0 and 11.0. Such a pH affects the rate of polishing and greatly reduces the viscosity of the precipitated silica slurry used. While as stated above, sodium hydroxide and ammonia have been used, organic ammonium hydroxides are also recommended. Commercial precipitated silicas having a range of pH from about 6 to 11.5 are available. A dispersion having a concentration of 3 to 10 percent silica in deionized water is usually suggested. The suspension is maintained at a flow rate of 1 to 2 gallons per minute.

In practice, it has been found difficult and/or burdensome to maintain the pH at the level determined by the required polishing agent and rate of finishing. It is thought that the fine polishing is primarily the result of the carefully regulated alkaline solution and that the silica surface is somewhat affected by the same alkali and helps to brush away the particles causing unevenness on the surface. However this might be, it has been necessary to keep a careful check on the pH level in the solution as none of these systems are buffered to maintain a given pH.

I have now discovered a much more straightforward approach to this difficulty. I have found that if a quaternary ammonium silicate having the proper pH is used to aid in the suspension of the silica, the pH may be maintained at the required level without the necessity of frequent checks and the continuous or intermittent addition of alkali.

The quaternary ammonium silicates useful in my invention are described in U.S. Pat. No. 3,239,521 and said patent is hereby incorporated by reference. The organic quaternary ammonium hydroxide useful in this invention are those which are soluble in water and form solutions having a pH above 9.5.

By way of example, in the past silicon has been polished with a suspension containing 3 percent of QUSO G 32, which is a precipitated microfine silica having a pH in dispersion of about 7.9 and containing about 0.4 percent titratable alkali and an ultimate particle size of about 15 millimicrons. This dispersion is then brought to a pH of 10.2 by the careful addition of sodium hydroxide and the pH is maintained by checking with a pH meter and adding NaOH as required. The polishing is done at a pressure of about 1.5 psi and a surface speed of about 5 feet per second with the suspension flowing at about 0.5 gallon per minute. As required, the suspension may be increased to 6 to 9 percent of silica and the pH raised to 10.4 to 10.6. The flow rate may vary from about 1 to 2 gallons per minute. Also, if it is desired to avoid contamination with sodium, ammonium hydroxide may be used and if it is further desired to avoid the odor of ammonia, then an organic ammonium hydroxide may be used but this is much more expensive.

By using my composition and procedure, I have the advantage of using a single system, that is the suspension is formed directly without the necessity for adding additional alkali. Furthermore, the suspension is readily prepared by merely adding water to a dry powder. This powder, furthermore, is practically dust free or at least is likely to produce much less dust than the microfine silica. The system has a very low sodium content and no odor of ammonia. Furthermore, these suspensions have a long shelf life, once prepared, and of course the original composition does not deteriorate on standing.

My composition may be formed by different procedures. The simplest procedure is merely to blend the dry microfine silica with the dry powdered quaternary ammonium silicate. On the other hand, the microfine silica may be blended with a liquid quaternary ammonium silicate and dried as for instance by spray drying. By another procedure, I may blend the microfine silica with a quaternary ammonium hydroxide and after allowing time for the reaction to form quaternary ammonium silicate the dispersion may be dried either by spray drying or other equivalent procedure. In general, I prefer to use from 50 to 58 parts by weight of the dry quaternary ammonium silicate blended with 50 to 42 parts by weight of the microfine silica with a low sodium content. If a quaternary ammonium silicate of a higher pH is used, then I may use 40 parts by weight of the high pH quaternary ammonium silicate and 60 parts by weight of the low pH finely divided silica. On the other hand, if a silica with a higher pH is used, then I may increase the relative proportion of a dry ammonium hydroxide.

In one case, silicon wafers were polished by using a 3 percent suspension of microfine silica obtained by dispersing a prepared dry composition at 50 parts by weight of a dry quaternary ammonium silicate, having a composition of 23.2 percent titratable alkali and 71.4 percent silica with 5.5 percent of water and 50 parts by weight of the microfine silica having a pH of 7.9 and $Na_2O$ content of 0.4 percent with ignited loss of 14.6 percent. This slurry had a pH of 10.0 and rose to a pH of 10.2 which was maintained for over 24 hours. This was used at a positive plate pressure of 1.5 lb. per square inch and an average surface speed of 5 feet per second with a flow rate of the polishing suspension of one gallon per minute. The removal rate and the surface were completely satisfactory giving rapid and complete removal of chemically dissolved silicon.

The dry mixture of the finely divided silica and the quaternary ammonium silicate was prepared by tumbling equal weights for an hour and then blending for 5 minutes with a high speed stirer.

The following table shows the characteristics of compositions having varying proportions of the quaternary ammonium silicate and silica.

| Weight Ratio of Quaternary Ammonium Silicate Solids to Precipitated Silica | % Alkali at 3% $SiO_2$ Slurry Calculated as $Na_2O$ | pH of 3% Slurry | 24 Hours |
|---|---|---|---|
| 50:50 | 2.20 | 10.00 | 10.20 |
| 25:75 | 1.26 | 9.28 | 9.35 |
| 75:25 | 2.94 | 10.50 | 10.68 |

More or less detailed claims will be presented hereinafter and even though such claims are rather specific in nature those skilled in the art to which this invention pertains will recognize that there are obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specificially recited in the claims. It is intended that all such obvious equivalents be encompassed within the scope of this invention and patent grant in accordance with the well known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. A stable dry powder suitable for polishing silicon metal when dispersed in water at a pH in the range of 9.5 to 11.0, consisting essentially of 25 to 75 parts by weight microfine silica and 75 to 25 parts by weight quaternary ammonium silicate.

2. The dry powder of claim 1 in which the composition is 40 to 58 parts by weight of quaternary ammonium silicate and 42 to 60 parts by weight of microfine silica of low sodium content.

3. The dry powder of claim 1 in which the composition is 50 to 58 parts by weight of quaternary ammonium silicate and 42 to 50 parts by weight of microfine silica of low sodium content.

4. A dispersion of the dry powder of claim 2 having a pH in the range of 9.5 to 11.0.

5. A dispersion of the dry powder of claim 2 having a pH in the range of 10.2 to 10.6.

* * * * *